United States Patent
Hathiramani et al.

(10) Patent No.: US 12,349,218 B2
(45) Date of Patent: Jul. 1, 2025

(54) ENHANCED MOBILITY FOR URLLC SERVICES AND REDUNDANT PDU SESSIONS

(71) Applicant: Nokia Technologies Oy, Espoo (FI)

(72) Inventors: Navin Hathiramani, Coppell, TX (US); Devaki Chandramouli, Plano, TX (US)

(73) Assignee: Nokia Technologies Oy, Espoo (FI)

( * ) Notice: Subject to any disclaimer, the term of this patent is extended or adjusted under 35 U.S.C. 154(b) by 105 days.

(21) Appl. No.: 17/516,481

(22) Filed: Nov. 1, 2021

(65) Prior Publication Data
US 2022/0150787 A1 May 12, 2022

Related U.S. Application Data

(60) Provisional application No. 63/110,397, filed on Nov. 6, 2020.

(51) Int. Cl.
*H04W 76/15* (2018.01)
*H04L 1/22* (2006.01)
(Continued)

(52) U.S. Cl.
CPC .............. *H04W 76/15* (2018.02); *H04L 1/22* (2013.01); *H04W 24/04* (2013.01);
(Continued)

(58) Field of Classification Search
CPC ..... H04W 36/30; H04W 76/15; H04W 24/04; H04W 28/0268; H04W 28/06; H04W 36/0027; H04W 28/24; H04L 1/22
See application file for complete search history.

(56) References Cited

U.S. PATENT DOCUMENTS

| 10,848,998 B2 * | 11/2020 | Hou ................ H04W 24/10 |
| 2016/0014648 A1 * | 1/2016 | Hamilton ........ H04W 36/0061 455/436 |

(Continued)

FOREIGN PATENT DOCUMENTS

| CN | 111083742 A | 4/2020 |
| CN | 111713135 A | 9/2020 |

(Continued)

OTHER PUBLICATIONS

"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.

(Continued)

*Primary Examiner* — Mandish K Randhawa
(74) *Attorney, Agent, or Firm* — McCarter & English LLP

(57) ABSTRACT

In accordance with example embodiments of the invention there is at least a method and apparatus to perform receiving from a network device, by a network node of a communication network, information regarding a secondary packet data unit session request for pairing the secondary packet data unit session with a primary packet data unit session, wherein information comprises an indication of at least one of the packet data unit session pair, a required quality of service or a required redundancy level for the secondary packet data unit session; based on the information, establishing the secondary packet data unit session; based on the establishing, sending towards the network device an indication of the secondary packet data unit session being established; storing the information regarding the secondary packet data unit session request; and forwarding at least part of the information regarding the secondary packet data unit (Continued)

session request to at least one target node during mobility procedure.

19 Claims, 7 Drawing Sheets

(51) Int. Cl.
- H04W 24/04 (2009.01)
- H04W 28/02 (2009.01)
- H04W 28/06 (2009.01)
- H04W 36/00 (2009.01)
- H04W 36/30 (2009.01)

(52) U.S. Cl.
CPC ....... *H04W 28/0268* (2013.01); *H04W 28/06* (2013.01); *H04W 36/0027* (2013.01); *H04W 36/302* (2023.05)

(56) References Cited

U.S. PATENT DOCUMENTS

| | | | |
|---|---|---|---|
| 2019/0116518 A1 | 4/2019 | Stojanovski et al. | |
| 2019/0335534 A1 | 10/2019 | Atarius et al. | |
| 2021/0306879 A1* | 9/2021 | Bergstrom et al. | ....... H04L 1/22 |

FOREIGN PATENT DOCUMENTS

| | | | |
|---|---|---|---|
| EP | 3474625 A1 | 4/2019 | |
| WO | 2020/067956 A1 | 4/2020 | |
| WO | WO-2020096396 A1 * | 5/2020 | ........... H04L 5/0053 |
| WO | WO-2022086408 A1 * | 4/2022 | |

OTHER PUBLICATIONS

"3rd Generation Partnership Project; Technical Specification Group Radio Access Network; NG-RAN; Xn application protocol (XnAP) (Release 16)", 3GPP TS 38.423, V16.3.0, Sep. 2020, pp. 1-451.

"New WID: System enhancement for Redundant PDU Session", 3GPP TSG SA2 Meeting #138E, S2-2003256, Agenda: 9.1, Nokia, Apr. 20-23, 2020, 3 pages.

"3rd Generation Partnership Project; Technical Specification Group Radio Access Network; Ng-Ran; Ng Application Protocol (NGAP) (Release 16)", 3GPP TS 38.413, V16.3.0, Sep. 2020, pp. 1-466.

International Search Report and Written Opinion received for corresponding Patent Cooperation Treaty Application No. PCT/IB2021/059895, dated Jan. 14, 2022, 10 pages.

Extended European Search Report received for corresponding European Patent Application No. 21204699.9, dated Apr. 4, 2022, 7 pages.

Huawei, HiSilicon, S2-1903745 "SMF actions on rejection of PDU Session or QoS flows during Handover and Service Request procedures", 3GPP tsg_sa\wg2_arch, 第 tsgs2_132_xian 期,, Apr. 2, 2019.

Ericsson,S2-1911100 "Updates for PDU Session pair information" 3GPP tsg_sa\wg2_arch, 第 tsgs2_136_reno 期,, Nov. 8, 2019.

* cited by examiner

570: receiving from a network node, by a network device of a communication network, information comprising an indication of a secondary packet data unit session being established by the network node based on at least one of a required quality of service or redundancy level for the secondary packet data unit session, wherein the secondary packet data unit session is paired with a primary packet data unit session

580: using, the information during a mobility procedure

FIG. 5B

ENHANCED MOBILITY FOR URLLC SERVICES AND REDUNDANT PDU SESSIONS

CROSS-REFERENCE TO RELATED APPLICATIONS

This application claims priority from U.S. provisional patent application No. 63/110,397 filed on Nov. 6, 2020. The contents of this earlier filed application are hereby incorporated by reference in their entirety.

TECHNICAL FIELD

The teachings in accordance with the exemplary embodiments of this invention relate generally to enhanced Ultra Reliable Low Latency Communication services and, more specifically, relate to enhanced Ultra Reliable Low Latency Communication services using redundant packet data unit sessions.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
  AC: Admission Control
  AMF: Access and Mobility Management Function
  CA: Carrier Aggregation
  CHO: Conditional Handover
  DC: Dual Connectivity
  DRB Dedicated Radio Bearer
  HO: Handover
  HW: Hardware
  NG-RAN: Next Generation Radio Access Network
  PDU: Protocol Data Unit
  QoE: Quality of Experience
  QoS: Quality of Service
  RSN Redundancy Sequence Number
  SMF: Session Management Function
  SN: Slave Node
  SW: Software
  TEI: Technical Enhancement or Improvement
  UE: User Equipment
  URLLC: Ultra Reliable Low Latency Communication Mobile communication technology has evolved significantly during and up to the time of this application. Such evolving has resulted in next generation wireless communication system, for example, fifth generation (5G) or new radio (NR) communication system, provides at least access to high speed information, applications, and data sharing.

For such high speed information, applications, and data sharing implementation require ultra-high reliability and low-latency communication (URLLC). At the time of this application a URLLC can be delivered using packet duplication (PD) where two redundant links are used to improve the reliability without increasing the latency of the URLLC. Example embodiments of the invention work to improve at least these type of operations.

SUMMARY

In an example aspect of the invention, there is an apparatus, such as a network side apparatus, comprising: at least one processor; and at least one memory including computer program code, where the at least one memory and the computer program code are configured, with the at least one processor, to cause the apparatus to at least: receive from a network device, by a network node of a communication network, information regarding a secondary packet data unit session request for pairing the secondary packet data unit session with a primary packet data unit session, wherein information comprises an indication of at least one of the packet data unit session pair, a required quality of service or a required redundancy level for the secondary packet data unit session; based on the information, establish the secondary packet data unit session; based on the establishing, send towards the network device an indication of the secondary packet data unit session being established; store the information regarding the secondary packet data unit session request; and forward at least part of the information regarding the secondary packet data unit session request to at least one target node during mobility procedure.

In another example aspect of the invention, there is a method comprising: receiving from a network device, by a network node of a communication network, information regarding a secondary packet data unit session request for pairing the secondary packet data unit session with a primary packet data unit session, wherein information comprises an indication of at least one of the packet data unit session pair, a required quality of service or a required redundancy level for the secondary packet data unit session; based on the information, establishing the secondary packet data unit session; based on the establishing, sending towards the network device an indication of the secondary packet data unit session being established; storing the information regarding the secondary packet data unit session request; and forwarding at least part of the information regarding the secondary packet data unit session request to at least one target node during mobility procedure.

In another example aspect of the invention, there is a non-transitory computer-readable medium storing program code, the program code executed by at least one processor to perform a method. The method may include receiving from a network device, by a network node of a communication network, information regarding a secondary packet data unit session request for pairing the secondary packet data unit session with a primary packet data unit session, wherein information comprises an indication of at least one of the packet data unit session pair, a required quality of service or a required redundancy level for the secondary packet data unit session; based on the information, establishing the secondary packet data unit session; based on the establishing, sending towards the network device an indication of the secondary packet data unit session being established; storing the information regarding the secondary packet data unit session request; and forwarding at least part of the information regarding the secondary packet data unit session request to at least one target node during mobility procedure.

In another example aspect of the invention, there is an apparatus comprising: means for receiving from a network device, by a network node of a communication network, information regarding a secondary packet data unit session request for pairing the secondary packet data unit session with a primary packet data unit session, wherein information comprises an indication of at least one of the packet data unit session pair, a required quality of service or a required redundancy level for the secondary packet data unit session; means, based on the information, for establishing the secondary packet data unit session; means, based on the establishing, for sending towards the network device an indication of the secondary packet data unit session being established; means for storing the information regarding the secondary packet data unit session request; and means for forwarding at least part of the information regarding the secondary packet data unit session request to at least one target node during mobility procedure In an example aspect of the invention, there is an apparatus, such as a user side apparatus, comprising: at least one processor; and at least one memory including computer program code, where the at least one memory and the computer program code are configured, with the at least one processor, to cause the apparatus to at least: receive from a network node, by a user equipment of a communication network, information comprising an indication of a secondary packet data unit session setup by the network node based on at least one of a required quality of service or redundancy level for the secondary packet data unit session, wherein the secondary packet data unit session is paired with a primary packet data unit session; receive configuration to be configured with handover or conditional handover target network nodes; and prioritize target network nodes for mobility procedure based on at least one of information of quality of service or information of a redundancy level associated with target network nodes.

In another example aspect of the invention, there is a method comprising: receiving from a network node, by a user equipment of a communication network, information comprising an indication of a secondary packet data unit session setup by the network node based on at least one of a required quality of service or redundancy level for the secondary packet data unit session, wherein the secondary packet data unit session is paired with a primary packet data unit session; receiving configuration to be configured with handover or conditional handover target network nodes; and prioritizing target network nodes for mobility procedure based on at least one of information of quality of service or information of a redundancy level associated with target network nodes.

In another example aspect of the invention, there is a non-transitory computer-readable medium storing program code, the program code executed by at least one processor to perform a method. The method may include receiving from a network node, by a user equipment of a communication network, information comprising an indication of a secondary packet data unit session setup by the network node based on at least one of a required quality of service or redundancy level for the secondary packet data unit session, wherein the secondary packet data unit session is paired with a primary packet data unit session; receiving configuration to be configured with handover or conditional handover target network nodes; and prioritizing target network nodes for mobility procedure based on at least one of information of quality of service or information of a redundancy level associated with the target network nodes.

In another example aspect of the invention, there is an apparatus comprising: means for receiving from a network node, by a user equipment of a communication network, information comprising an indication of a secondary packet data unit session setup by the network node based on at least one of a required quality of service or redundancy level for the secondary packet data unit session, wherein the secondary packet data unit session is paired with a primary packet data unit session; means for receiving configuration to be configured with handover or conditional handover target network nodes; and means for prioritizing target network nodes for mobility procedure based on at least one of information of quality of service or information of a redundancy level associated with target network nodes.

A communication system comprising at least one network side apparatus and user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 5A, FIG. 5B, and FIG. 5C each show a method in accordance with example embodiments of the invention which may be performed by an apparatus.

DETAILED DESCRIPTION

Figure 1:
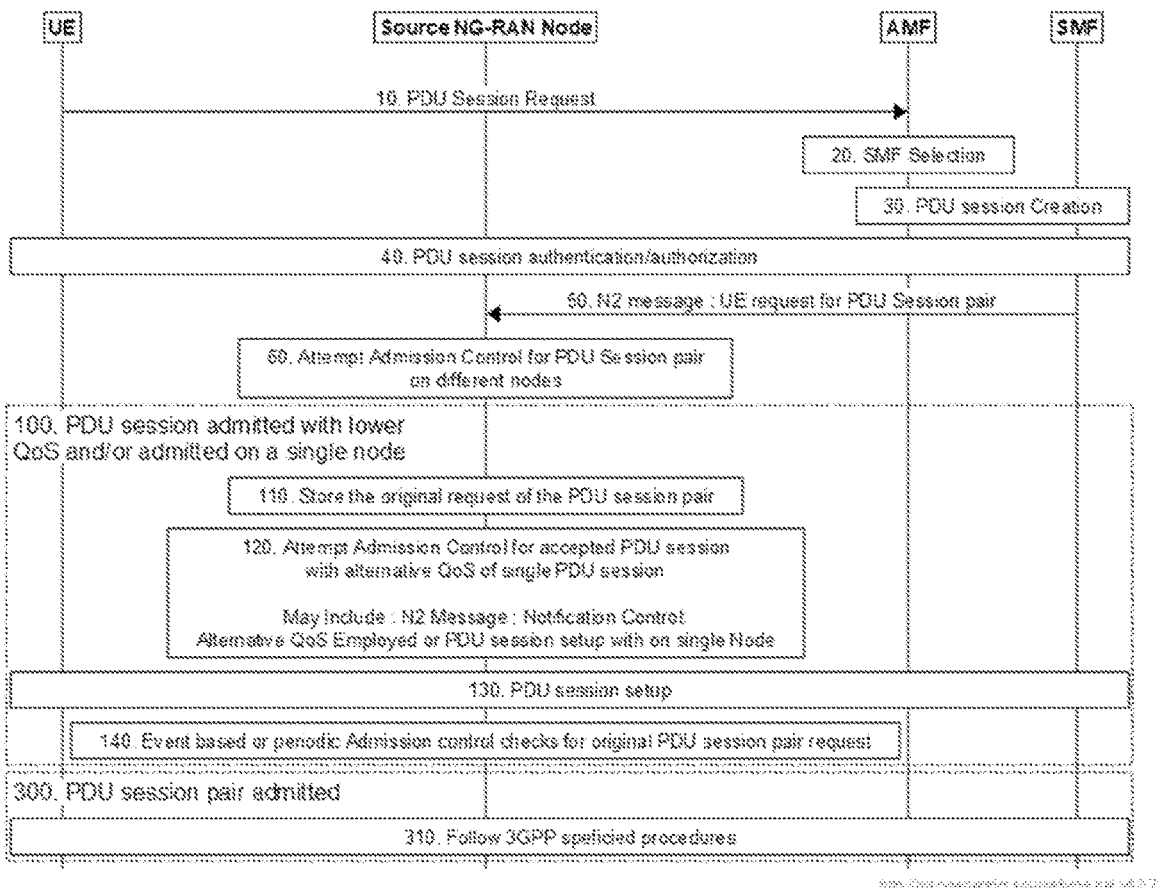
FIG. 1 shows a Message Sequence Admission control of PDU pair session in accordance with an example embodiment of the invention.

In this invention, there is proposed a novel method for improvement of enhanced Ultra Reliable Low Latency Communication services using redundant packet data unit sessions.

At the time of this application 3GPP is actively discussing system enhancements for Redundant PDU sessions to further enable URLLC use cases.

RAN3 preferred that the SMF provides PDU Session pair information to gain flexibility with SN selection, also gNB-CU/DU selection. Since the UE has the knowledge about the redundant session, it is proposed that the UE provides an indication to the SMF that the PDU Sessions are linked so that the SMF can provide this to the RAN that the RAN can eventually use for SN selection, also gNB CU/DU Selection. This would allow the two PDU Sessions to be independently established without any constraints on the selected SMF.

The UE should include an indication for both PDU sessions, which means, both the first PDU session and second PDU session include an indication identifying the paired PDU sessions, and SMFs send paired PDU Session indication towards NG-RAN for each of the PDU sessions.

Then if the UE releases the first PDU session of a pair and establishes a $3^{rd}$ PDU session, the paired PDU Session indication can still be used for coordination.

As specified in current standards the redundancy indication from the UE could also be valuable to address scenarios, such as for two UEs scenario with two different PDU Sessions.

When the NG-RAN node is requested to perform the setup of the PDU session pair it will initiate an admission control process to ensure it has sufficient resources to setup the pair of PDU sessions with the requested QoS or possibly alternative QoS if provided by the SMF. The NG-RAN node will target different nodes (master/slave) on which to admit the PDUs of the pair in order to maximize the provided redundancy.

The NG-RAN node is aware of the request of the UE to setup a PDU session pair. It is possible that the NG-RAN node admits the DRB request for one or both of the redundant PDU Sessions with lower QoS than requested. In this case, the DRBs for the PDU Session pair remain established with the lower QoS until DRBs are released via RRC Release procedure. Note in this case the lower associated QoS of the PDU session pair would be maintained during mobility procedures.

During the Admission Control (AC) process, the NG-RAN node may not be able to admit the PDU sessions of the pair on different nodes as desired for reliability purpose, hence decreasing the provided redundancy and reliability. The decreased redundancy/reliability setup would be employed for the UE until the PDU session is released. With the current procedures there could be a constant degradation of the redundancy and QoS to propagate during the lifetime of the PDU session as the UE propagates from one node to another due to mobility.

Example embodiments of this invention targets enabling at least following aspects for redundant PDU sessions:
1) At the time of DRB Setup for one of the PDU session pair, the NG-RAN node may consider an alternative QoS for the singe admitted PDU session, which may be different from the alternative QoS considered for the other PDU session in the pair as part of Admission Control procedure;
2) NG-RAN node may check either based on certain internal events/triggers (e.g. resource availability, load variation larger than XX % etc.) or periodically the possibility to re-attempt admission control procedure for the DRB s that correspond to PDU Session pair for which lower QoS was established;
3) If the admission control procedure for a rejected redundant PDU Session is successful after the initial UE request, the NG-RAN node may inform the SMF to trigger a PDU session modification via the Notification Control procedure;
4) Even if the NG-RAN node was unable to select different radio node as part of DRB setup request during PDU Session establishment for one of the PDU Session pairs, the NG-RAN node performs the following:
a. NG-RAN establishes the DRB using the same radio node, stores the PDU Session Pair information and it responds to the SMF that the DRB has been established without redundancy/reliability;
b. At the time of handover from source NG-RAN node to target NG-RAN node, it forwards information regarding rejected PDU session or admitted PDU Session pairs on a single node to target NG-RAN during mobility procedures;
c. The target NG-RAN node will use the PDU Session pair and redundant PDU Session request establishment to select NG-RAN node that may be different from the linked PDU Session.

Note Steps 4a) b) an c) can also be applied for scenarios where the DRB's of a PDU session pair are admitted with a lower QoS than requested; and
5) During mobility scenarios (HO, CHO) the target node may setup the UE with a Dual Connectivity (DC)/Carrier Aggregation (CA) configuration, even for scenarios in which there was no DC/CA configured in the source node. This could be targeted to fulfill a higher QoS, reliability and/or redundancy requirements.

Figure 2:
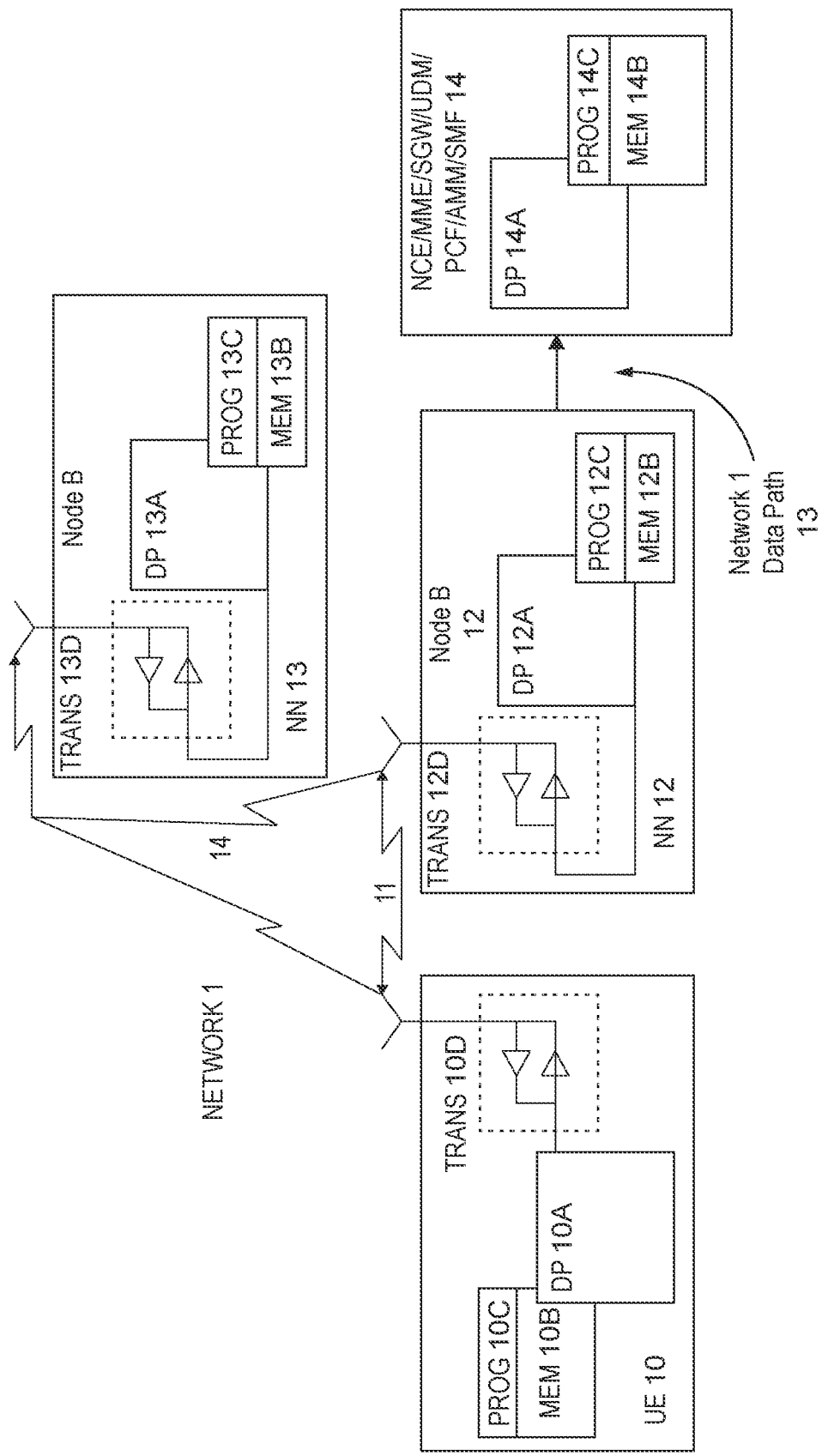
FIG. 2 shows a high level block diagram of various devices used in carrying out various aspects of the invention.

However, before describing the example embodiments of the invention in more detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1 or network, 1 as in FIG. 2. The wireless network 1 or network 1 as in FIG. 2 can comprise a communication network such as a mobile network e.g., the mobile network 1 or mobile network such as is part of Network 1 as in FIG. 2 as disclosed herein. Any reference herein to a wireless network 1 as in FIG. 2 can be seen as a reference to any wireless network as disclosed herein. Further, the wireless network 1 as in FIG. 2 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12 and NN 13. The one or more memories MEM 10B include computer program code PROG 10C. The UE 10 communicates with NN 12 and/or NN 13 via a wireless link 11 and/or wireless link 14, respectively.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 2. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D can be optionally connected to one or more antennas for communication over at least wireless link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via wireless link 14. Further, the wireless link 11, wireless link 14 and/or any other link may be wired or wireless or both and may implement, e.g., an X2 or Xn interface. Further the wireless link 11 and/or wireless link 14 may be through other network devices such as, but not limited to an NCE/SGW/AMF/UPF device such as the NCE/MME/SGW/UDM/PCF/AMM/SMF 14 of FIG. 2. The NN 12 may or may not comprise an MME (Mobility Management Entity) or SGW (Serving Gateway), and may perform functionalities of an MME (Mobility Management Entity) or SGW (Serving Gateway), such as a User Plane Functionality, and/or an Access Management functionality for LTE and similar functionality for 5G.

The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 13D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., wireless link 11 or another link. The wireless link 14 as shown in FIG. 2 can be used for communication between the NN 12 and the NN 13. These links maybe wired or wireless or both and may implement, e.g., an X2 or Xn interface. Further, as stated above the wireless link 11 and/or wireless link 14 may be through other network devices such as but not limited to a core network element of the network 1, and/or for example such as but not limited to an NCE/MME/SGW device such as the NCE/MME/SGW/UDM/PCF/AMM/SMF 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 2 shows a network nodes such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device may perform the functions. In addition, the cell makes up part of a gNB, and there can be multiple cells per gNB.

The wireless network 1 or any network it can represent may or may not include a NCE/MME/SGW/UDM/PCF/AMM/SMF 14 that may include network control element (NCE) functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses such as for example coupled with the link 13. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP 10, DP 12A, DP 13A, and/or DP 14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP 10, DP 12A, DP 13A, and DP 14A may be of any type suitable to the local technical environment, and may include one or more of general purpose computers, special purpose computers, microprocessors, digital signal processors (DSPs) and processors based on a multi-core processor architecture, as non-limiting examples. The processors DP 10, DP 12A, DP 13A, and DP 14A may be means for performing functions, such as controlling the UE 10, NN 12, NN 13, and other functions as described herein.

FIG. 1 shows a message sequence of operations in accordance with an example embodiment of the invention. The message sequence in FIG. 1 provides more in detail the handling redundant PDU sessions admissions.

As shown in step 10 of FIG. 1 a UE requests the setup of a PDU session pair. The UE includes some type of indicator which informs the SMF that the PDUs are part of a pair. In regards to step 10:

1) A UE sends a PDU Session request along with the indicator for redundant PDU Session setup (RSN), PDU session pair indication (to indicate that this is one amongst the PDU Session pair) as part of N2 SM container;

As shown in step 20 of FIG. 1 the serving AMF selects an SMF and ensures the contexts to support the requested PDU sessions are created as in step 30 of FIG. 1. With regards to these steps 203 and/or 30:

2) The AMF selects the appropriate SMF for the PDU Session and forwards the N2 SM container. SMF processes the PDU Session establishment request and determines the need to establish redundant PDU Session based on UE's request, local policies for the given DNN/NSSAI. If applicable, the SMF initiates secondary PDU Session authentication;

In step 40 of FIG. 1 PDU session authentication and authorization procedures are performed. In step 50 of FIG. 1 the SMF informs the NG-RAN node that the PDU session requested by the UE is part of a pair, i.e., one PDU session is redundant, and should ideally be served by different node (and not the same as the other PDU Session) to increase redundancy of the U-plane paths. Also, in step 50 the SMF may optionally also provide alternative QoS lists to be employed for the PDU session as a pair and/or an alternative QoS to be applied when only a single PDU of the session pair can be admitted by NG-RAN. With regards to step 50 the SMF can include the PDU Session pair indication, RSN indicator, alternative QoS in the request sent to the NG-RAN node. This enables the NG-RAN node to have a prioritized list of alternative QoS for:

The PDU session pair, where each PDU session in the pair may have different QoS

A single PDU session of the pair, where in a higher QoS requirement could be attempted due to the inability of the RAN to support the PDU session pair.

Further, as shown in step 60 of FIG. 1 the NG-RAN node shall perform admission control for the PDU session pair based on the QoS criteria's requested by the UE or employing alternative QoS provided by the SMF. The NG-RAN node shall prioritize to maximize the redundancy (HW/SW) for the PDU session pair and offer the best possible QoS as present in the alternative QoS. A detailed flow chart of the process which may be followed by the NG-RAN node is displayed in FIG. 3 with further explanations below.

It is noted that at step 60, if during the AC procedure, NG-RAN determines that the PDU Session cannot be admitted by a redundant node, then the NG-RAN accepts same node admission but stores the request from the SMF so that it can re-attempt after a period of time and/or based on the trigger of some events and/or it can forward this as part of UE QoS requirements to the target NG-RAN node during handover request procedures.

As shown in step 100 of FIG. 1 the PDU session admitted with a lower QoS and/or admitted on a single node. As shown in step 110 of FIG. 1 there is storing the original request of the PDU session pair. As shown in step 120 of FIG. 1 there may be an attempted admission control for accepted PDU session with alternative QoS of single PDU session, and may include: N2 message: Notification control: and/or alternate QoS employed PDU session setup with single node.

In step 130 of FIG. 1 there is PDU session setup. As shown in step 140 of FIG. 1 there is event based or periodic admission checks for original PDU session pair request. As shown in step 300 of FIG. 1 the PDU session pair admitted. Then as shown in step 310 of FIG. 1 there is following 3GPP specified procedures.

As shown in step 60 of FIG. 1, if during the AC procedure in step 60, NG-RAN determines that the PDU Session cannot be admitted with the best possible QoS as in the alternative QoS list, then the NG-RAN accepts it with the QoS parameters possible at that point in time but stores the request from the SMF so that it can re-attempt after a period of time and/or based on the trigger of some events and/or it can forward this as part of UE QoS requirements to target NG-RAN nodes during handover request procedures.

Further, with regard to FIG. 1:

3) The NG-RAN node understands that the PDU Session request is one amongst the redundant PDU Session pair and that redundancy with different SW/HW is needed. the NG-RAN node shall perform admission control for the PDU session pair based on the QoS criteria's requested by the UE or employing alternative QoS provided by the SMF. The NG-RAN node shall prioritize to maximize the redundancy (HW/SW) for the PDU session pair and offer the best possible QoS as present in the alternative QoS;

4) If during the AC procedure as shown in step 60 of FIG. 1, NG-RAN determines that the PDU Session cannot be admitted by a redundant node, then the NG-RAN accepts in the same node but stores the request from the SMF [step 110] so that it can re-attempt after a period of time and/or based on internal triggers and/or it can forward this as part of UE QoS requirements to target NG-RAN nodes during handover request procedures. If during the AC procedure as shown in step 60 of FIG. 1, NG-RAN determines that the PDU Session cannot be admitted with the best possible QoS as in the alternative QoS list, then the NG-RAN accepts it with the QoS parameters possible at that point in time but stores the request [step 110] from the SMF so that it can re-attempt after a period of time and/or it can forward this as part of UE QoS requirements to target NG-RAN nodes, such as for a non-limiting example during handover request procedures;

5) In this case, for example as in step 120 of FIG. 1, the NG-RAN node responds to the SMF including the QoS that was setup, also indicates that the PDU Session request was successful but not setup in the redundant node as requested. This is done as part of NGAP message (PDU Session Setup response or N2 notification control);

6) In step 130 of FIG. 1, the SMF proceeds with PDU Session establishment with the UE; and 7) As per step 140 in FIG. 1, the NG-RAN node may trigger admission control periodically (i.e. Timer T1) or event based during the time established by timer T1.

During mobility scenarios (HO, CHO) the target node may setup the UE with a DC/CA configuration, even for scenarios in which there was no DC/CA configured in the source node. This could be targeted to fulfil a higher QoS, reliability and/or redundancy requirements.

Figure 3:
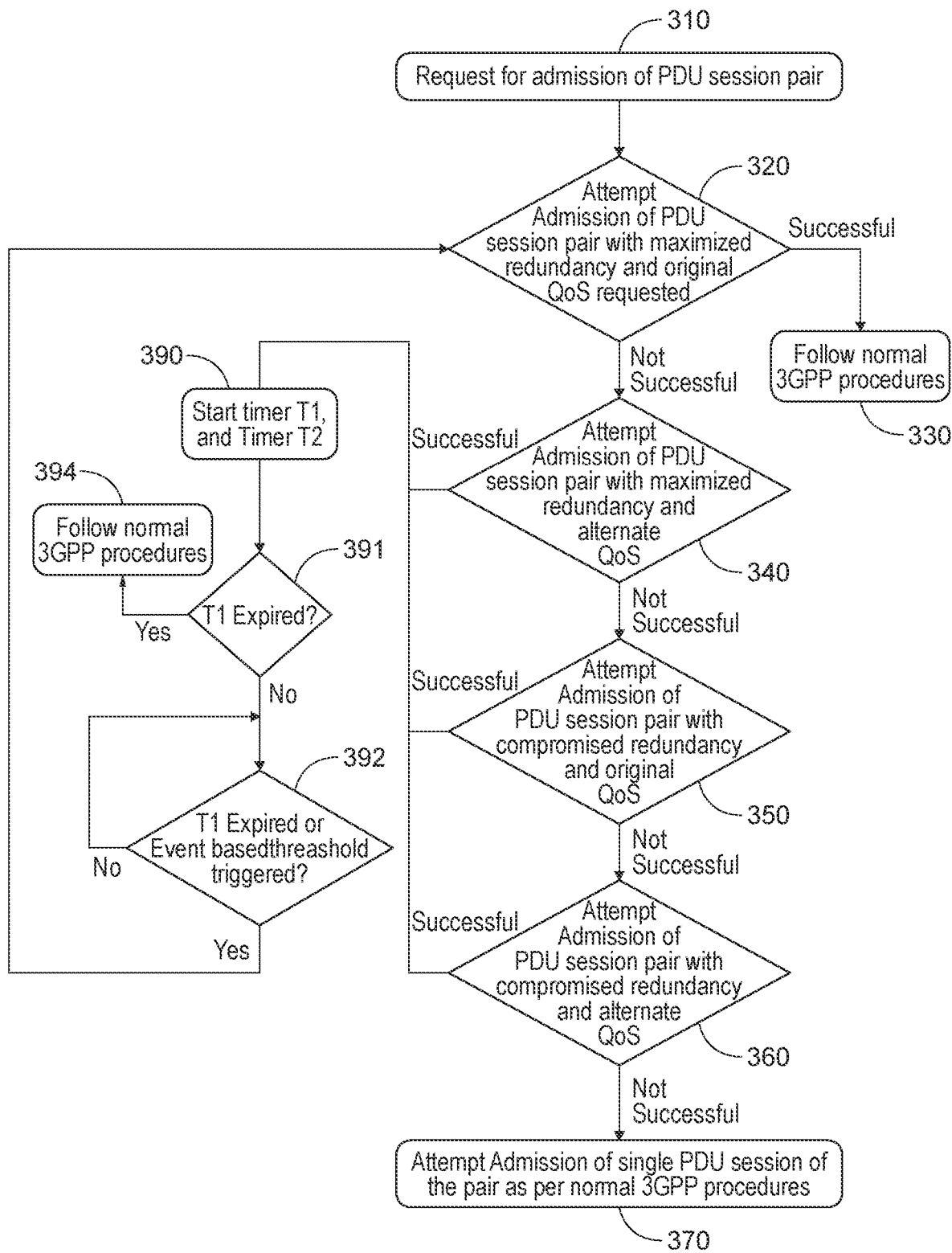
FIG. 3 shows an NG-RAN node AC procedure for PDU session pair.

The NG-RAN admission control procedure for PDU session pair is depicted in FIG. 3.

FIG. 3 shows an NG-RAN node AC procedure for PDU session pair. As shown in step 310 of FIG. 3 there is a request for admission of PDU session pair. As shown in step 320 of FIG. 3 the NG-RAN node may attempt admission of PDU session pair with maximized redundancy and original QoS requested. If successful then as shown in step 330 of FIG. 3 normal 3GPP procedures may be followed. As shown in step 340 of FIG. 3 attempt admission of PDU session pair with maximized redundancy and alternate QoS. As shown in step 350 of FIG. 1 there is an attempt admission of PDU session pair with compromised redundancy and original QoS. As shown in step 360 of FIG. 3 there is an attempt admission of PDU session pair with compromised redundancy and alternate QoS. As shown in each of steps 340, 350, and 360 of FIG. 3 if successful, then as shown in step 390 there is starting timer T1 and timer T2. As shown in step 391 of FIG. 3 it is determined if timer T1 has expired. If yes, then as shown in step 394 of FIG. 3 there is following normal 3GPP procedures. As shown in step 392 of FIG. 3 it is determined if the timer T2 has expired or event based threshold triggered. If yes here, then the operations return to step 320.

Further in regards to FIG. 3 there is upon a request to setup a PDU session pair 310 the node may evaluate whether it has the capabilities to provide the desired QoS and redundancy for the pair at step 320 of FIG. 3. If the node can successfully admit the pair it shall follow normal 3GPP procedures for the PDU session handling as in step 330 of FIG. 3. If the NG-RAN node cannot admit the pair as per the QoS and redundancy requirements provided it shall store the original PDU session pair request and proceed to as shown in step 340 of FIG. 3. In steps 340, 350, and 360 of FIG. 3 the NG-RAN node evaluates the capability to admit the PDU session pair with impaired capabilities in terms of either QoS and/or redundancy. If the admission control is successful in any of these steps the node shall re-attempt the AC procedure either periodically or based on event based triggers during a period of time established by timer T1. The timer T1 may, e.g., be configurable in the NG-RAN node, as shown in steps 390 to 392 of FIG. 3.

More in details, as shown in step 340 of FIG. 3 the AC is performed to prioritize the maximum redundancy but employing alternative QoS lists for each PDU session of the pair which may have been provided to the NG-RAN node.

As shown in step 350 of FIG. 3 the NG-RAN node evaluates the possibility of the admitting the PDU session pair with compromised redundancy, e.g., same compute node but different SW instances. If unsuccessful, as shown in step 360 of FIG. 3 AC is performed for compromised redundancy and employing alternative QoS lists which may have been provided to the NG-RAN node.

If the PDU session is admitted with QoS or redundancy characteristics which did not meet the targets established by the original request as in step 390 of FIG. 3 a timer T1 is started during which the AC procedure may be re-attempted by the NG-RAN node. Additionally, in step 390 of FIG. 3 a timer T2 is started. This timer is employed to determine when the periodical evaluation of the AC should be performed during the T1 period. In addition to allowing periodic checks for the AC of the PDU session pair, event-based checks are also allowed. These event-based criteria's could be defined based on the variation of load of components, interfaces or resources within the control of the NG-RAN node. For example, a trigger for re-attempting the AC procedure could be established based on the NG-RAN nodes U-plane compute capacity dropping below a pre-defined threshold.

Figure 4:
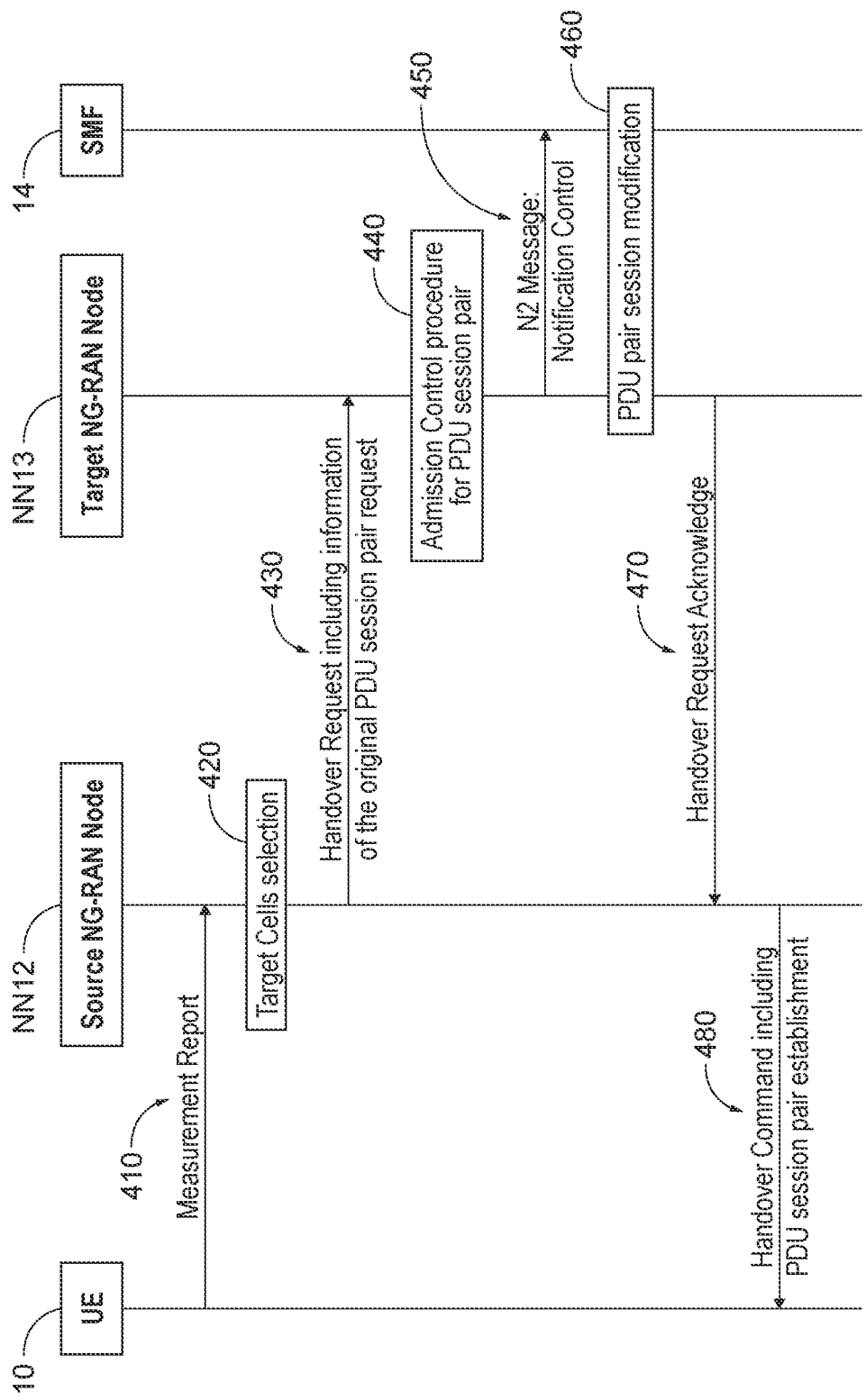
FIG. 4 shows Message Sequence for Handover with PDU session pair request.

FIG. 4 shows Message Sequence for Handover with PDU session pair request. As shown in FIG. 4 there is a UE 10, source NG-RAN node NN 12, target NG-RAN node NN 13, and an SMF 14.

As shown in step 410 of FIG. 4 there is communicated between the UE 10 and the source NG-RAN node NN 12 a measurement report. As shown in step 420 of FIG. 4 the source NG-RAN node NN 12 makes a target cell selection. As shown in step 430 of FIG. 4 there is communicated between the source NG-RAN node NN 12 and the target NG-RAN node NN 13 a handover request including information of original PDU session pair request. As shown in step 440 of FIG. 4 the target NG-RAN node NN 13 performs admission control procedure for PDU session pair. As shown in step 450 of FIG. 4 there is communicated between the target NG-RAN node NN 13 and the SMF 14 N2 message notification control. As shown in step 460 of FIG. 4 there is PDU session pair notification communicated between the target NG-RAN node NN 13 and the SMF 14. As shown in step 460 of FIG. 4 there is communicated between the target NG-RAN node NN 13 and the SMF 14 PDU pair session modification. As shown in step 470 of FIG. 4 there is communicated between the target NG-RAN node NN 13 and the source NG-RAN node NN 12 handover request acknowledgement. Then as shown in step 480 of FIG. 4 there is communicated between the source NG-RAN node NN 12 and the UE 10 handover command including PDU session pair establishment.

With regards to example embodiments of the invention as shown at least in FIG. 1, FIG. 3, and FIG. 4 the following operations are noted:

1) Based on measurement reports, HO is triggered and target cells are selected by the Source NG-RAN node;
2) Source NG-RAN node sends HO request to the Target NG-RAN node and it includes the redundant session indicator (RSN), PDU Session pair indicator and the alternative QoS profile;
3) The target NG-RAN node performs the AC procedure considering the originally requested QoS, RSN and PDU session pair indicator (even if the source node could not fulfill the needs when requested by the SMF originally). If the target NG-RAN node can't meet original or requested QoS requirements then may employ the alternative QoS or lower redundancy level. In step 450 of FIG. 4 if the PDU session pair can be admitted with a different QoS than currently established in the source node, the target node informs the SMF to initiate a PDU pair session modification as shown in step 460 of FIG. 4. In step 470 of FIG. 4 the source NG-RAN node is notified that the target node has successfully performed AC and it informs the source node of the outcome of the AC procedure for PDU session pair; and
4) In case there is an update in the QoS established for the QoS Flow within the PDU Session, the SMF initiates PDU Session modification procedure with the UE.

In addition, during mobility scenarios (HO, CHO) the target node may setup the UE with a DC/CA configuration, even for scenarios in which there was no DC/CA configured in the source node. This could be targeted to fulfil a higher QoS, reliability and/or redundancy requirements.

More in detail, FIG. 4 displays the message sequence a handover scenario where either a PDU session of pair is rejected or admitted without meeting the requirements of the original request in terms of QoS or redundancy (HW/SW). In step 410 of FIG. 4 a Measurement Report provided by a UE could trigger the source NG-RAN node to evaluate target cells for handover purposes as shown in step 450 of FIG. 4. The selected target cells would receive a Handover Request including information on the original PDU session pair request as shown in step 430 of FIG. 4. This prevents the degradation of the redundancy and QoS to propagate through the network during the lifetime of the PDU session as the UE moves between different nodes. In step 420 of FIG. 4 the source cell may decide how many target nodes it will initiate a Handover Request procedure for. To limit the c-plane load and unnecessary capacity reservations the source cell could use a timer or trigger based criteria. For example, the source cell may decide to include a node in the selected target list if for example:
- It's the only node reported by the UE;
- Last time the node was attempted for AC of a PDU Redundant Session with XX criteria lower or equal to the request it succeeded to meet it;
- No active backlist/prohibit timers associated with the target cell; and/or
- Number of nodes selected for evaluation as target cells is less than YY As shown in step 440 of FIG. 4 the NG-RAN node performs the AC procedure for the PDU session pair. As shown in step 450 of FIG. 4 if the PDU session pair can be admitted with a different QoS than currently established in the source node, the target node informs the SMF to initiate a PDU pair session modification as shown in step 460 of FIG. 4. As similarly shown in step 470 of FIG. 4 the source NG-RAN node is notified that the target node has successfully performed AC and it informs the source NG-RAN node of the outcome of the AC procedure for QoS and PDU session pair. The information provided to the source NG-RAN node may include:
- QoS of PDU sessions admitted; and/or
- If the PDU session pair is admitted, the level of redundancy achieved: HW only, HW and SW, other Further in step 480 of FIG. 4, based on the capabilities of the different target nodes to provide for the PDU session pair requirements, the source NG-RAN node may select the node providing the highest redundancy and QoS as the node to which the UE should perform the HO procedure. Note that other target nodes evaluated as candidates may be provided a HO cancel message.

The above procedure is also applicable to conditional HO scenarios, where multiple target cells can be prepared. During for example step 480 of FIG. 4 for a conditional HO scenario the UE may be informed of the level of redundancy that may be achieved via the different target cells. This can be done by including information such as the below in step 480:
- QoS of PDU sessions admitted;
- If the PDU session pair is admitted, the level of redundancy achieved: HW only, HW and SW, other; and/or
- DC/CA setup The UE could employ this information to prioritize the target cells when it performs measurements. It is also possible for NG-RAN node or UE to scale HO trigger criteria's for different cells based on the level of redundancy provided by each cell, e.g., the relative time to trigger of different target cells could be scaled to favour the cell which provides the highest redundancy. If several target cells are selected for HO, target cells which are not employed for HO or as HO candidates are released via a HO cancel.

In mobility scenarios the serving NG-RAN node could prefer cells which have the capacity and capability to support the PDU session pair. HO target selection or Conditional HO cells provided to the UE could be based on these criteria.

It is submitted that technical effects of operations in accordance with example embodiments of the invention can include:
- Allows for maximizing redundancy even though at the time of admission this could not be achieved;
- Prevent the degradation of the redundancy and QoS to propagate during the lifetime of the PDU session;
- Allows improved QoS and improved redundancy/reliability upon handover even if the source node could not support the expected redundancy and best possible QoS;
- Enables auto recovery of PDU Session pair establishment in redundant nodes;
- Possibility of steering UE within the network based on the need for redundant PDU session request when it was admitted without meeting the requirements of the original request; and
- The benefits in allowing the source cell probing more than one target node is to maximize the QoE the end user had originally requested for its active service. This method also allows non-homogeneous network deployments for operators, i.e., not every single node in their network needs to be prepared to support redundancy. Evaluating more than one target cells for PRS allows to get the UE back on the cells which are designated for this type of traffic and maximizes the end user experience. Note that there is a cost associated with better mobility, smaller outages and ultra reliability in general, which is typically network capacity, reserving extra resources and additional c-plane load to handle these.

Figure 5A:
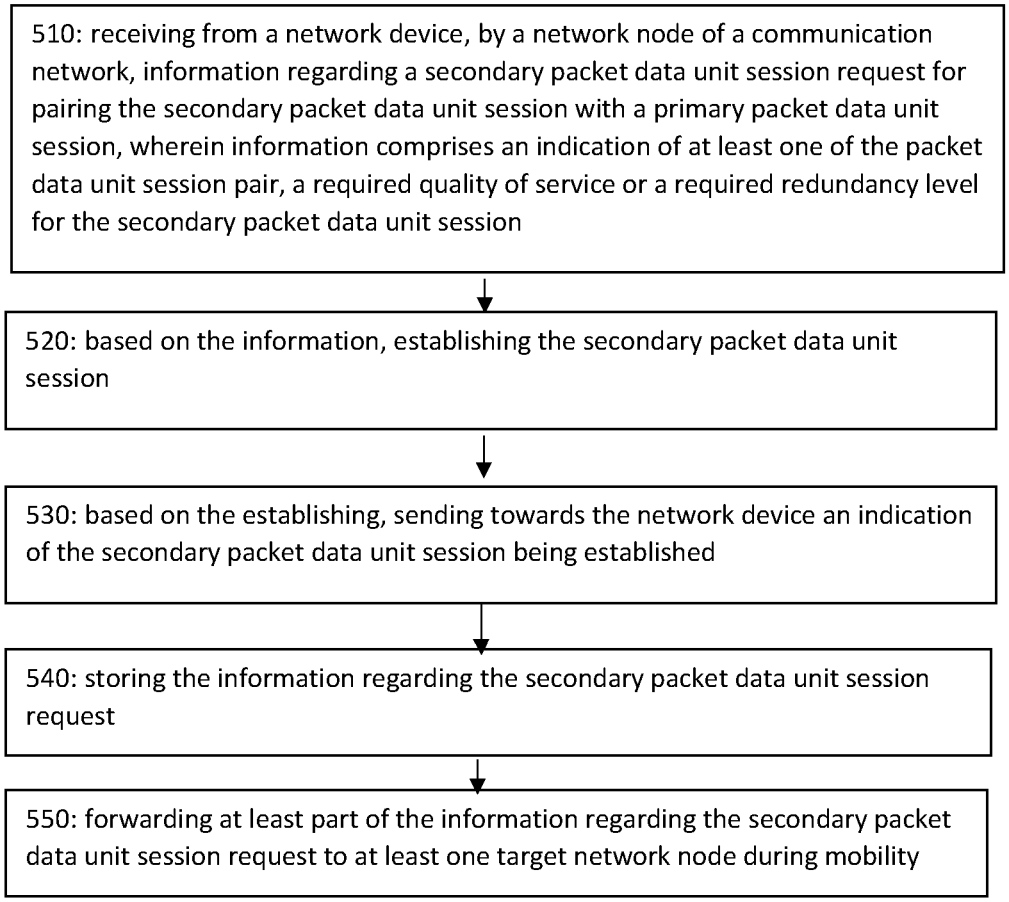

FIG. 5A and FIG. 5B each show a method in accordance with example embodiments of the invention which may be performed by an apparatus.

FIG. 5A illustrates operations which may be performed by a network device such as, but not limited to, a network node NN 12 or NN 13 as in FIG. 2 or an eNB. FIG. 5A shows a method in accordance with example embodiments of the invention which may be performed by an apparatus. As shown in step 510 of FIG. 5A there is receiving from a network device, by a network node of a communication network, information regarding a secondary packet data unit session request for pairing the secondary packet data unit session with a primary packet data unit session, wherein information comprises an indication of at least one of the packet data unit session pair, a required quality of service or a required redundancy level for the secondary packet data unit session. As shown in step 520 of FIG. 5A there is, based on the information, establishing the secondary packet data unit session. As shown in step 530 of FIG. 5A there is, based on the establishing, sending towards the network device an indication of the secondary packet data unit session being established. As shown in step 540 of FIG. 5A there is storing the information regarding the secondary packet data unit session request. Then as shown in step 550 of FIG. 5A there is forwarding at least part of the information regarding the secondary packet data unit session request to at least one target node during mobility procedure.

In accordance with an example aspect of the invention as described in the paragraph above, wherein the establishing comprises: based on the information, determining whether the at least one of a required quality of service or redundancy level for the secondary packet data unit session can be met, and establishing the secondary packet data unit session with an alternative quality of service different than the required quality of service for pairing the packet data unit session, or establishing the secondary packet data unit session with a redundancy level different than the required redundancy level.

In accordance with an example aspect of the invention as described in the paragraphs above, wherein the secondary packet data unit session comprises a redundant packet data unit session.

In accordance with an example aspect of the invention as described in the paragraphs above, wherein based on at least the required quality of service or redundancy level not being met, the method comprising: starting a first timer to identify a duration during which the establishing may be re-attempted.

In accordance with an example aspect of the invention as described in the paragraphs above, there is during the duration of the first timer, starting a second timer, wherein the second timer is used to identify a time for the re-attempt of the establishing, or re-attempting the establishing based on an event based trigger.

In accordance with an example aspect of the invention as described in the paragraphs above, wherein the re-attempting comprises: attempting during the duration of the first timer to establish the secondary packet data unit session with the at least one of a redundancy availability or a maximum level of quality of service capability.

In accordance with an example aspect of the invention as described in the paragraphs above, wherein the event based triggers are based on at least one of a resource availability or cell load variation.

In accordance with an example aspect of the invention as described in the paragraphs above, wherein the event based triggers are based on at least one of the resource availability or load variation one of matching, exceeding, or being below a pre-defined threshold.

In accordance with an example aspect of the invention as described in the paragraphs above, wherein the re-attempting is in response to the secondary packet data unit session being established with a quality of service being below the required quality of service for the secondary packet data unit session and/or being not setup with the required redundancy level.

In accordance with an example aspect of the invention as described in the paragraphs above, wherein the re-attempting is based on the stored information of secondary packet data unit session request.

In accordance with an example aspect of the invention as described in the paragraphs above, wherein the information comprises at least one of the alternative quality of service or the alternative redundancy level for the paired packet data unit session.

In accordance with an example aspect of the invention as described in the paragraphs above, wherein the information causes configuration of a Dual Connectivity (DC)/Carrier Aggregation (CA) configuration, even for scenarios in which there was no DC/CA configured in the source node, to target a higher QoS, reliability and/or redundancy requirements.

In accordance with an example aspect of the invention as described in the paragraphs above, wherein the determining comprises: determining information of at least one of the alternative quality of service, reliability/redundancy capability, and one of a dual connectivity or carrier aggregation configuration the redundant packet data unit session is admitted with.

In accordance with an example aspect of the invention as described in the paragraphs above, wherein the network node is configured with redundant packet data unit sessions for a conditional handover.

In accordance with an example aspect of the invention as described in the paragraphs above, wherein configuration of the conditional handover for the more than one target network node include QoS/redundancy level information.

In accordance with an example aspect of the invention as described in the paragraphs above, wherein the network node employs the QoS/Redundancy level information for handover or conditional handover target prioritization.

In accordance with an example aspect of the invention as described in the paragraphs above, wherein the establishing is performed to prioritize a maximum redundancy by employing quality of service lists for each packet data unit session.

In accordance with an example aspect of the invention as described in the paragraphs above, wherein the information received from the network device includes an alternative QoS list.

In accordance with an example aspect of the invention as described in the paragraphs above, wherein the information received from the network device includes an alternative QoS to be employed for the primary packet data unit session if the secondary PDU session is rejected.

In accordance with an example aspect of the invention as described in the paragraphs above, there is receiving from the at least one target network node an indication of a successfully performed admission control of the secondary packet data unit session or/and information of at least one of QoS admitted and the level of redundancy achieved.

In accordance with an example aspect of the invention as described in the paragraphs above, there is selecting a target node for handover based on the indication.

In accordance with an example embodiment of the invention as described above there is an apparatus comprising: means for receiving (TRANS 12D and/or TRANS 13D, MEM 12B and/or MEM 13B, PROG 12C and/or PROG 13C, and DP 12A and/or DP 13A as in FIG. 2) from a network device, by a network node of a communication network, information regarding a secondary packet data unit session request for pairing (TRANS 12D and/or TRANS 13D, MEM 12B and/or MEM 13B, PROG 12C and/or PROG 13C, and DP 12A and/or DP 13A as in FIG. 2) the secondary packet data unit session with a primary packet data unit session, wherein information comprises an indication of at least one of the packet data unit session pair, a required quality of service or a required redundancy level for the secondary packet data unit session; means, based on the information, for establishing (TRANS 12D and/or TRANS 13D, MEM 12B and/or MEM 13B, PROG 12C and/or PROG 13C, and DP 12A and/or DP 13A as in FIG. 2) the secondary packet data unit session; means, based on the establishing, for sending (TRANS 12D and/or TRANS 13D, MEM 12B and/or MEM 13B, PROG 12C and/or PROG 13C, and DP 12A and/or DP 13A as in FIG. 2) towards the network device an indication of the secondary packet data unit session being established; means for storing (TRANS 12D and/or TRANS 13D, MEM 12B and/or MEM 13B, PROG 12C and/or PROG 13C, and DP 12A and/or DP 13A as in FIG. 2) the information regarding the secondary packet data unit session request; and means for forwarding (TRANS 12D and/or TRANS 13D, MEM 12B and/or MEM 13B, PROG 12C and/or PROG 13C, and DP 12A and/or DP 13A as in FIG. 2) at least part of the information regarding the secondary packet data unit session request to at least one target node during mobility procedure.

In the example aspect of the invention according to the paragraph above, wherein at least the means for receiving, establishing, sending, storing, and forwarding comprises a non-transitory computer readable medium [MEM 12B and/or MEM 13B] encoded with a computer program [PROG 12C and/or PROG 13C] executable by at least one processor [DP 12A and/or DP 13A].

FIG. 5B illustrates operations which may be performed by a network device such as, but not limited to, a UE 10 as in FIG. 2. FIG. 5B or a user equipment, FIG. 5B shows a method in accordance with example embodiments of the invention which may be performed by an apparatus. As shown in step 570 of FIG. 5B there is receiving from a network node, by a network device of a communication network, information comprising an indication of a secondary packet data unit session being established by the network node using an admission control based on at least one of a required quality of service or redundancy level for the secondary packet data unit session, wherein the secondary packet data unit session is paired with a primary packet data unit session. Then as shown in step 580 of FIG. 5B there is using, the information during a mobility procedure.

In accordance with an example aspect of the invention as described in the paragraph above, wherein the admission control comprises: admission control of the secondary packet data unit session depending on whether at least one of a required quality of service or redundancy level for performing the admission of the secondary packet data unit session can be met, wherein the secondary packet data unit session is established with at least one of an alternative quality of service different than the required quality of service for pairing the packet data unit session, or with a redundancy level different than the required redundancy level.

In accordance with an example aspect of the invention as described in the paragraphs above, wherein the secondary packet data unit session comprises a redundant packet data unit session.

In accordance with an example aspect of the invention as described in the paragraphs above, wherein the information comprises an indication of a paired packet data unit session, the desired QoS and redundancy/reliability level and the alternative quality of service for the paired packet data unit session.

In accordance with an example aspect of the invention as described in the paragraphs above, wherein the information causes the network device to configure a Dual Connectivity (DC)/Carrier Aggregation (CA) configuration, even for scenarios in which there was no DC/CA configured in the source node, to target a higher QoS, reliability and/or redundancy requirements.

In accordance with an example aspect of the invention as described in the paragraphs above, wherein the network device is configured with redundant packet data unit sessions for a conditional handover.

In accordance with an example aspect of the invention as described in the paragraphs above, wherein the network device is configured for at least one of prioritizing conditional handover cell measurements or prioritizing of target network nodes based on at least one of information of quality of service or information of a redundancy level associated with target network nodes.

In accordance with an example aspect of the invention as described in the paragraphs above, wherein configuration of the conditional handover for the more than one target network node include QoS/redundancy level information.

In accordance with an example aspect of the invention as described in the paragraphs above, wherein the network device employs the QoS/Redundancy level information for handover or conditional handover target prioritization.

In accordance with an example aspect of the invention as described in the paragraphs above, wherein the admission control is prioritizing a maximum redundancy by employing quality of service lists for each at least one of a packet data unit, a quality of service flow, or a dedicated radio bearer of the packet data unit session.

In accordance with an example aspect of the invention as described in the paragraphs above, wherein the admission control used information from the network node comprising an alternative QoS list.

In accordance with an example aspect of the invention as described in the paragraphs above, wherein the information from the network node includes an alternative QoS to be employed for the primary packet data unit session if the secondary PDU session is rejected.

In accordance with an example embodiment of the invention as described above there is an apparatus comprising: means for receiving (TRANS 10D, MEM 10B, PROG 10C, and DP 10A as in FIG. 2) from a network node, by a network device (UE 10) of a communication network, information comprising an indication of a secondary packet data unit session being established by the network node using an admission control based on at least one of a required quality of service or redundancy level for the secondary packet data unit session, wherein the secondary packet data unit session is paired with a primary packet data unit session; and means for using (TRANS 10D, MEM 10B, PROG 10C, and DP 10A as in FIG. 2), the information during a mobility procedure.

In the example aspect of the invention according to the paragraph above, wherein at least the means for receiving and means for using comprises a non-transitory computer readable medium [MEM 10B] encoded with a computer program [PROG 10C] executable by at least one processor [DP 10A].

Figure 5C:
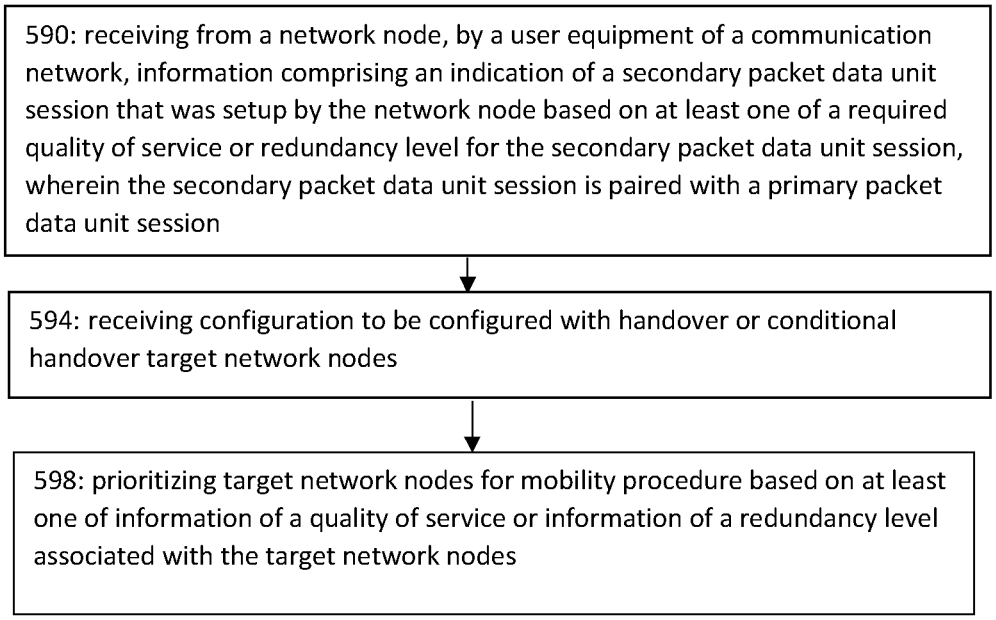

FIG. 5C illustrates operations which may be performed by a network device such as, but not limited to, a UE 10 as in FIG. 2. As shown in step 590 of FIG. 5C there is receiving from a network node, by a user equipment of a communication network, information comprising an indication of a secondary packet data unit session that was setup by the network node based on at least one of a required quality of service or redundancy level for the secondary packet data unit session, wherein the secondary packet data unit session is paired with a primary packet data unit session. As shown in step 594 of FIG. 5C there is receiving configuration to be configured with handover or conditional handover target network nodes. Then as shown in step 598 of FIG. 5C there is prioritizing target network nodes for mobility procedure based on at least one of information of a quality of service or information of a redundancy level associated with the target network nodes.

In accordance with an example aspect of the invention as described in the paragraph above, wherein the information causes configuration of a Dual Connectivity (DC)/Carrier Aggregation (CA) configuration, even for scenarios in which there was no DC/CA configured in the network node, to target at least one of a higher QoS, reliability or redundancy requirements.

In accordance with an example aspect of the invention as described in the paragraphs above, wherein the user equipment is configured with redundant packet data unit sessions for a conditional handover.

In accordance with an example aspect of the invention as described in the paragraphs above, there is prioritizing conditional handover cell measurements based on at least one of information of a quality of service or information of a redundancy level associated with the target network nodes.

In accordance with an example aspect of the invention as described in the paragraphs above, wherein configuration for the conditional handover include QoS/redundancy level information.

In accordance with an example aspect of the invention as described in the paragraphs above, wherein the user equipment employs the QoS/Redundancy level information for handover or conditional handover target prioritization.

In accordance with an example embodiment of the invention as described above there is an apparatus comprising: means for receiving (TRANS 10D, MEM 10B, PROG 10C, and DP 10A as in FIG. 2), from a network node (NN 12, NN 13, and/or NCE/MME/SGW/UDM/PCF/AMM/SMF 14 as in FIG. 2), by a user equipment (UE 10 as in FIG. 2) of a communication network (Network 1 as in FIG. 2), information comprising a secondary packet data unit session that was setup by the network node based on at least one of a required quality of service or redundancy level for the secondary packet data unit session, wherein the secondary packet data unit session is paired with a primary packet data unit session. Means for receiving configuration to be configured (TRANS 10D, MEM 10B, PROG 10C, and DP 10A as in FIG. 2) with handover or conditional handover target network nodes. Means for prioritizing (TRANS 10D, MEM 10B, PROG 10C, and DP 10A as in FIG. 2) target network nodes for mobility procedure based on at least one of information of a quality of service or information of a redundancy level associated with target network nodes.

In the example aspect of the invention according to the paragraph above, wherein at least the means for receiving, means for receiving and means for prioritizing comprises a non-transitory computer readable medium [MEM 10B] encoded with a computer program [PROG 10C] executable by at least one processor [DP 10A].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
(a) hardware-only circuit implementations (such as implementations in only analog and/or digital circuitry);
(b) combinations of hardware circuits and software, such as (as applicable):
(i) a combination of analog and/or digital hardware circuit(s) with software/firmware; and
(ii) any portions of hardware processor(s) with software (including digital signal processor(s)), software, and memory(is) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   receiving from a network device, by a network node of a communication network, information regarding a secondary packet data unit session request for pairing the secondary packet data unit session with a primary packet data unit session,
   wherein information comprises a packet data unit session pair indicator identifying a packet data session pair comprising the primary packet data unit session and the secondary packet data unit session, a required quality of service, and a required redundancy level indicated by a redundant sequence number (RSN) for the secondary packet data unit session;
   based on the information, establishing the secondary packet data unit session;
   based on the establishing, sending towards the network device an indication of the secondary packet data unit session being established;
   storing the information regarding the secondary packet data unit session request; and
   forwarding at least part of the information regarding the secondary packet data unit session request to at least one target network node during mobility procedure.

2. The method of claim 1, wherein the secondary packet data unit session comprises a redundant packet data unit session.

3. The method of claim 2, comprising:
   determining information of at least one of an alternative quality of service, reliability/redundancy capability, and one of a dual connectivity or carrier aggregation configuration the redundant packet data unit session is admitted with.

4. The method of claim 1, wherein the information comprises at least one of an alternative quality of service or an alternative redundancy level for the paired packet data unit session, and wherein the establishing is performed even though the network device could not fulfill previously requested operations.

5. The method of claim 1, wherein the information includes an alternative quality of service list.

6. The method of claim 1, comprising:
   configuring a user equipment with handover or conditional handover target network nodes, wherein the configuring comprises configuring the user equipment for prioritizing of target network nodes based on at least one of information of quality of service or information of a redundancy level associated with target network nodes.

7. The method of claim 1, wherein the establishing comprises:
   based on the information, determining whether the at least one of a required quality of service or redundancy level for the secondary packet data unit session can be met; and
   establishing the secondary packet data unit session with an alternative quality of service different than the required quality of service for pairing the packet data unit session, or establishing the secondary packet data unit session with an alternative redundancy level different than the required redundancy level.

8. The method of claim 1, wherein the establishing comprises prioritizing and establishing redundantly the packet data unit session pair indicator with at least one of different software or different hardware for providing an alternative quality of service to provide a higher level of quality of service for the secondary packet data unit session.

9. An apparatus, comprising:
   at least one processor; and
   at least one memory storing instructions, that when executed by the at least one processor cause the apparatus to at least:
   receive from a network device information regarding a secondary packet data unit session request for pairing the secondary packet data unit session with a primary packet data unit session,
   wherein information comprises a packet data unit session pair indicator identifying a packet data session pair comprising the primary packet data unit session and the secondary packet data unit session, a required quality of service, and a required redundancy level indicated by a redundant sequence number (RSN) for the secondary packet data unit session;
   based on the information, establish the secondary packet data unit session;
   based on the establishing, send towards the network device an indication of the secondary packet data unit session being established; and store the information regarding the secondary packet data unit session request; and forwarding at least part of the information regarding the secondary packet data unit session request to at least one target network node during mobility procedure.

10. The apparatus of claim 9, wherein the secondary packet data unit session comprises a redundant packet data unit session.

11. The apparatus of claim 10, wherein the at least one memory storing instructions is executed by the at least one processor, to cause the apparatus to:

determine information of at least one of an alternative quality of service, reliability/redundancy capability, and one of a dual connectivity or carrier aggregation configuration the redundant packet data unit session is admitted with.

12. The apparatus of claim 9, wherein the information comprises at least one of an alternative quality of service or an alternative redundancy level for the paired packet data unit session, and wherein the establishing is performed even though the network device could not fulfill previously requested operations.

13. The apparatus of claim 9, wherein the information includes an alternative quality of service list.

14. The apparatus of claim 9, wherein the information includes an alternative quality of service to be employed for the primary packet data unit session if the secondary protocol data unit session is rejected.

15. The apparatus of claim 9, wherein the at least one memory storing instructions is executed by the at least one processor, to cause the apparatus to:

configure a user equipment with handover or conditional handover target network nodes, wherein the configuring comprises configuring the user equipment for prioritizing of target network nodes based on at least one of information of quality of service or information of a redundancy level associated with target network nodes.

16. The apparatus of claim 9, wherein when establishing the secondary packet data unit session, the apparatus is caused to:

based on the information, determine whether the at least one of a required quality of service or redundancy level for the secondary packet data unit session can be met; and establish the secondary packet data unit session with an alternative quality of service different than the required quality of service for pairing the packet data unit session, or establish the secondary packet data unit session with an alternative redundancy level different than the required redundancy level.

17. An apparatus, comprising:

at least one processor; and at least one memory including computer program code, where the at least one memory is storing instructions that when executed by the at least one processor cause the apparatus to at least:

send to a network node of a communication network, information regarding a secondary packet data unit session request for pairing the secondary packet data unit session with a primary packet data unit session, wherein information comprises a packet data unit session pair indicator identifying a packet data session pair comprising the primary packet data unit session and the secondary packet data unit session, a required quality of service, and a required redundancy level indicated by a redundant sequence number (RSN) for the secondary packet data unit session; and receive from the network node an indication of the secondary packet data unit session being established.

18. The apparatus of claim 17, wherein the secondary packet data unit session comprises a redundant packet data unit session.

19. The apparatus of claim 17, wherein the information comprises at least one of an alternative quality of service or an alternative redundancy level for the paired packet data unit session, and wherein the establishing is performed even though the network device could not fulfill previously requested operations.

* * * * *